United States Patent
Raghavan et al.

(10) Patent No.: US 11,710,281 B1
(45) Date of Patent: *Jul. 25, 2023

(54) RENDERING VIRTUAL ENVIRONMENTS USING CONTAINER EFFECTS

(71) Applicant: META PLATFORMS TECHNOLOGIES, LLC, Menlo Park, CA (US)

(72) Inventors: Srilatha P. Raghavan, Saratoga, CA (US); Nikhil Vijay Chandhok, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,771

(22) Filed: Sep. 2, 2021

Related U.S. Application Data

(63) Continuation of application No. 16/590,201, filed on Oct. 1, 2019, now Pat. No. 11,138,799.

(51) Int. Cl.
  *G06T 19/00* (2011.01)
  *G06F 16/583* (2019.01)
  *G06T 15/50* (2011.01)

(52) U.S. Cl.
  CPC ........ *G06T 19/006* (2013.01); *G06F 16/5854* (2019.01); *G06T 15/50* (2013.01)

(58) Field of Classification Search
  CPC .......................... G06T 15/005; G06T 19/006
  See application file for complete search history.

(56) References Cited

U.S. PATENT DOCUMENTS

| | | |
|---|---|---|
| 11,138,799 B1 | 10/2021 | Raghavan et al. |
| 2008/0005731 A1* | 1/2008 | Markovic ........... G06F 9/44521 717/162 |
| 2008/0071559 A1 | 3/2008 | Arrasvuori |
| 2012/0218423 A1 | 8/2012 | Smith et al. |
| 2013/0286004 A1* | 10/2013 | McCulloch ........... G06T 19/006 345/419 |
| 2016/0224657 A1 | 8/2016 | Mullins |
| 2018/0236354 A1 | 8/2018 | Van Boven et al. |
| 2019/0259205 A1 | 8/2019 | Nissinen et al. |
| 2020/0082627 A1 | 3/2020 | Palos et al. |

FOREIGN PATENT DOCUMENTS

WO   2014182545 A1   11/2014

OTHER PUBLICATIONS

U.S. Appl. No. 16/590,201 titled "Rendering Virtual Environments Using Container Effects" filed Oct. 1, 2019, pp. all.

\* cited by examiner

*Primary Examiner* — Charles Tseng
(74) *Attorney, Agent, or Firm* — Lee & Hayes, P.C.

(57) ABSTRACT

In one embodiment, a computer implemented method for rendering virtual environments is disclosed. The method includes associating by a computing system, an object with a container effect, by receiving information regarding an object category for the object and matching the object category to a category associated with the container effect, where the container effect defines virtual effects for objects associated therewith. The method also includes generating by the computing system a virtual environment including the object by retrieving a model of the object an utilizing the model and the container effect to render a virtual object.

20 Claims, 5 Drawing Sheets

RENDERING VIRTUAL ENVIRONMENTS USING CONTAINER EFFECTS

CROSS REFERENCE TO RELATED APPLICATION(S)

This application is a continuation of U.S. patent application Ser. No. 16/590,201 filed Oct. 1, 2019 and issued as U.S. Pat. No. 11,138,799 on Oct. 5, 2021. The aforementioned application, and issued patent, is incorporated herein by reference, in its entirety, for any purpose.

FIELD

The present disclosure relates generally to alternative reality and virtual reality experiences and effects.

BACKGROUND

Alternative and virtual reality experiences are increasingly used to allow consumers to experience products in a more realistic environment. Virtual reality (VR) refers to a simulated environment created by computer technology. Augmented reality (AR) refers a live direct or indirect view of a physical, real-world environment whose elements are augmented (e.g., supplemented) by computer technology. VR and/or AR can be presented to a user through an AR/VR system. In some examples, an AR/VR system includes an AR/VR headset that provides visual and audio information to the user. Augmented or virtual reality effects (referred to as AR effects herein) may be used to render objects appearing in the effects. AR effects may be displayed through a variety of devices. For example, augmented-reality effects may be displayed on a users AR/VR headset, mobile phone, tablet, laptop, computer monitor, television, or any other display devices.

SUMMARY

In one embodiment, a computer implemented method for rendering virtual environments is disclosed. The method includes associating by a computing system, an object with a container effect, such as by receiving information regarding an object category for the object and matching the object category to a category associated with the container effect, where the container effect defines virtual effects for objects associated therewith. The method also includes generating by the computing system a virtual environment including the object by retrieving a model of the object an utilizing the model and the container effect to render a virtual object.

In another embodiment, a computer implemented method is disclosed, the method including associating by a computer system a first object with a first container effect, the first container effect defining one or more virtual effects, associating by the computer system a second object with the first container effect, and publishing by the computer system an environment including the first object and the second object by retrieving and applying the one or more virtual effects defined by the first container effect to a model of the first object and a model of the second object.

In yet another embodiment, a computer readable medium including instructions that when executed by at least one process of a computing system cause the computing system to perform a method is disclosed. The method includes assigning an object to a container effect, the container effect determining effect characteristics for the object in a virtual environment, retrieving shape information for the object, rendering a virtual object by applying the effect characteristics of the container effect to the shape information of the object, generating an effect display by integrating the virtual object with image data, and providing the effect display for presentation.

DETAILED DESCRIPTION

The present disclosure includes methods to integrate objects, such as products, from different sources or parties into a single alternative reality (AR) or virtual reality experience by utilizing containers. Container effects include predetermined AR effects, such as lighting, trackers, transitions, orientation, etc., that may be applied to one or more objects associated with the containers.

Typically, a container effect will be defined for a category of objects, e.g., furniture, makeup, clothing, etc. As objects are added to an database from different sources, the objects are associated with a select container effect and when published within an AR and/or VR experience adopt the AR effects defined by the container effect, rather the AR effects being combined with and defined in conjunction with the shape information of the object. The separation between effects and shape information allows the shape information to be stored separately from the AR effects, such that new objects can be added into an on-going AR experience without having to recreate the AR effects.

Additionally, multiple objects associated with the same container effect can be added directly into a currently rendered AR experience, since no separate rendering of object specific AR effects may be needed. As AR experiences with objects are built by a user, a user can define a collection of the objects, which can be saved and transmitted to other users. Other users can then modify and update the collection, by adding or replacing objects associated with the defined container effect into the AR experience.

As a specific example, models of sofas from different retailers may be added to the AR database and associated with a predetermined furniture container effect. As a particular sofa is selected for an AR experience, the system renders the AR effect defined by the furniture container effect (rather than the specific effect for the selected sofa) and the sofa is placed in the AR experience. As additional objects associated with the container type are selected for the AR experience, the 3D models are retrieved and dynamically placed into the environment, without having to re-render the AR effects.

It should be noted that the term AR experience is meant to encompass all types of virtual or digitally displayed and/or digitally supplemented environments, such as those that incorporate a physical environment and/or allow a user to interact within a completely virtual environment (e.g., VR environment). For example, the AR environment may include a real-world scene with computer generated objects composited with the scene or alternatively allow a user to interact with or view objects from different viewpoints and angles. The AR environment may include background or other image data from a user device or may not include any image data from a user device. As such, the term AR should be interpreted to encompass both VR and AR environments, content, and the like.

Figure 1:
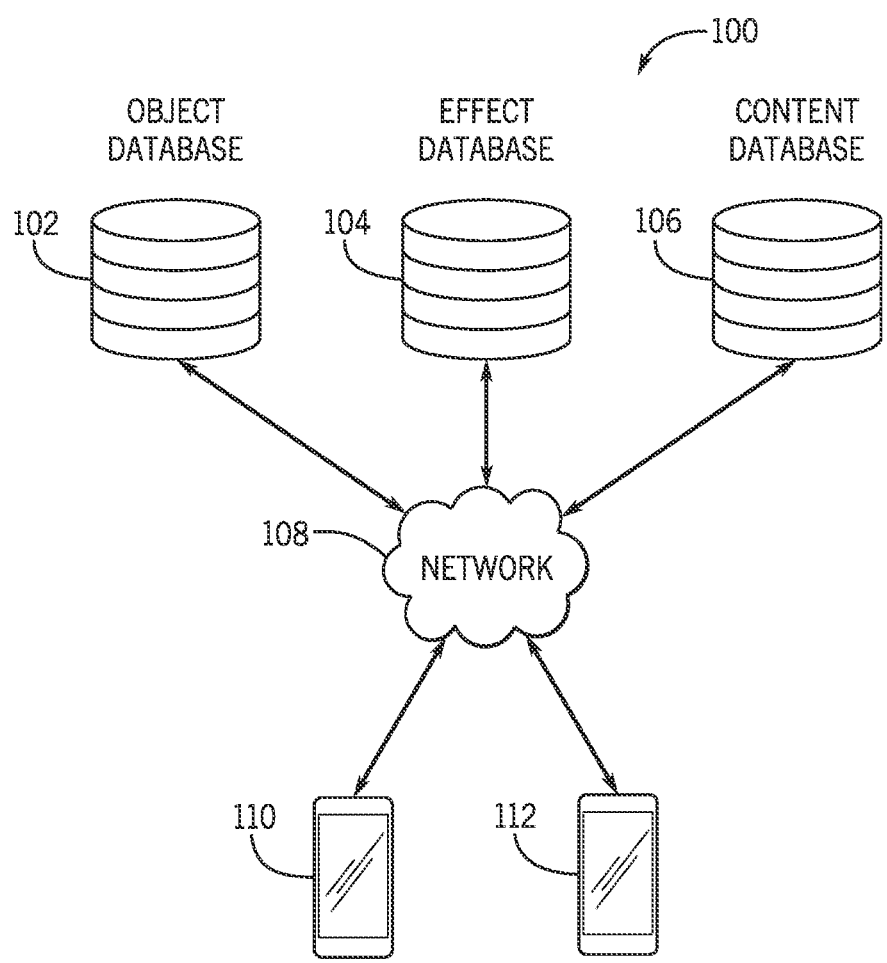
FIG. 1 illustrates a computing system for implementing virtual effects for an object within a virtual environment.

FIG. 1 illustrates a computing system 100 for generating AR experiences including one or more computing resources, such as servers 102, 104, 106, one or more networks 108, and one or more user devices 110, 112, where the network 108 provides communication between the servers 102, 104, 106 and the user devices 110, 112 (either directly or indirectly). During operation, the servers 102, 104, 106 provide objects, content, and AR effects that are displayed on the user devices 110, 112.

The servers or databases 102, 104, 106 may be substantially any type of computing resource, such as, but not limited to, a database, computing elements, cloud databases, virtual distributed databases, and the like. In one embodiment, a first server may include an object database 102 that receives and stores information related to objects, such as, shape information, three-dimensional (3D) information or models (e.g., gITF, glb, computer aided design models) and other information that can be used to generate virtual representations of objects. The object database 102 may receive information from third parties, such as, vendors, clients, retailers, and other partners and may include shape information related to objects that partners wish to have represented within an AR environment. For example, the object database 102 may include a retailer catalog having retail products or items that are offered by the third party (e.g., goods). In addition to the shape information, the object database 102 may also include color, texture, and other information that may be useful for rendering purposes and/or object options that correspond to variations of the product. The object database 102 also includes an effect or object category that identifies the particular type of container effect to be applied to the object in the AR environment. For example, the object database 102 may also include a link, reference, or other pointer, such as a uniform resource identifier (URI), that identifies a container effect to be applied to the object.

The second server may be an effect database 104, that stores AR effects for objects. In particular, container effects are stored in the effect database 104. The effect database 104 may include various types of AR effects or virtual effects, such as constraints, or rules that can be applied to the object to render a realistic AR experience. AR effects include trackers, positioning information, lighting, multiplane tracking, frame transitions, tracker templates with predetermined positions, interconnectivity between objects and trackers, and the like. In some embodiments, the AR effects may be stored based on a category or type and are applicable to multiple objects, in this manner, the effect database can function as a lookup table or other repository for AR effects for object types.

The third server may be a content database 106 that stores AR content, such as an AR environment, and other information that may be incorporated into an AR experience on the user device. Additionally, the content database 106 may be used to generate AR effect links by combining a particular object (e.g., shape information and texture) with its corresponding effect type to publish the AR effect on a user device.

It should be noted that the various servers 102, 104, 106 or databases may on a single computing device and/or split across various servers, computing devices, as needed. As such, the discussion of any particular server or database is not meant as a separate physical device, but a separate resource or allocation location.

The network 108 is substantially any type of data communication mechanism and may include multiple different communication pathways. For example, the network 108 may be the Internet, WiFi, Bluetooth, Zigbee, cellular transmissions, local area network, wireless network, telephone network, and the like, as well as a combination of two or more communication mechanisms.

The user devices 110, 112 are computing devices utilized by one or more users to access or otherwise view an AR experience. For example, the user devices 110, 112 may be smartphones, tablet computers, wearable devices (e.g., smart glasses, heads-up displays), laptop computers, desktop computers, smart television, IoT devices, and the like. In some instances, the system 100 includes multiple users and may include a first user device 110 corresponding to a first user and a second a user device 112 corresponding to a second user. Generally, the user devices 110, 112 may include a display screen or other image forming element and a camera, where the camera can be used to capture image information for objects that can be displayed in the AR environment.

Figure 2:
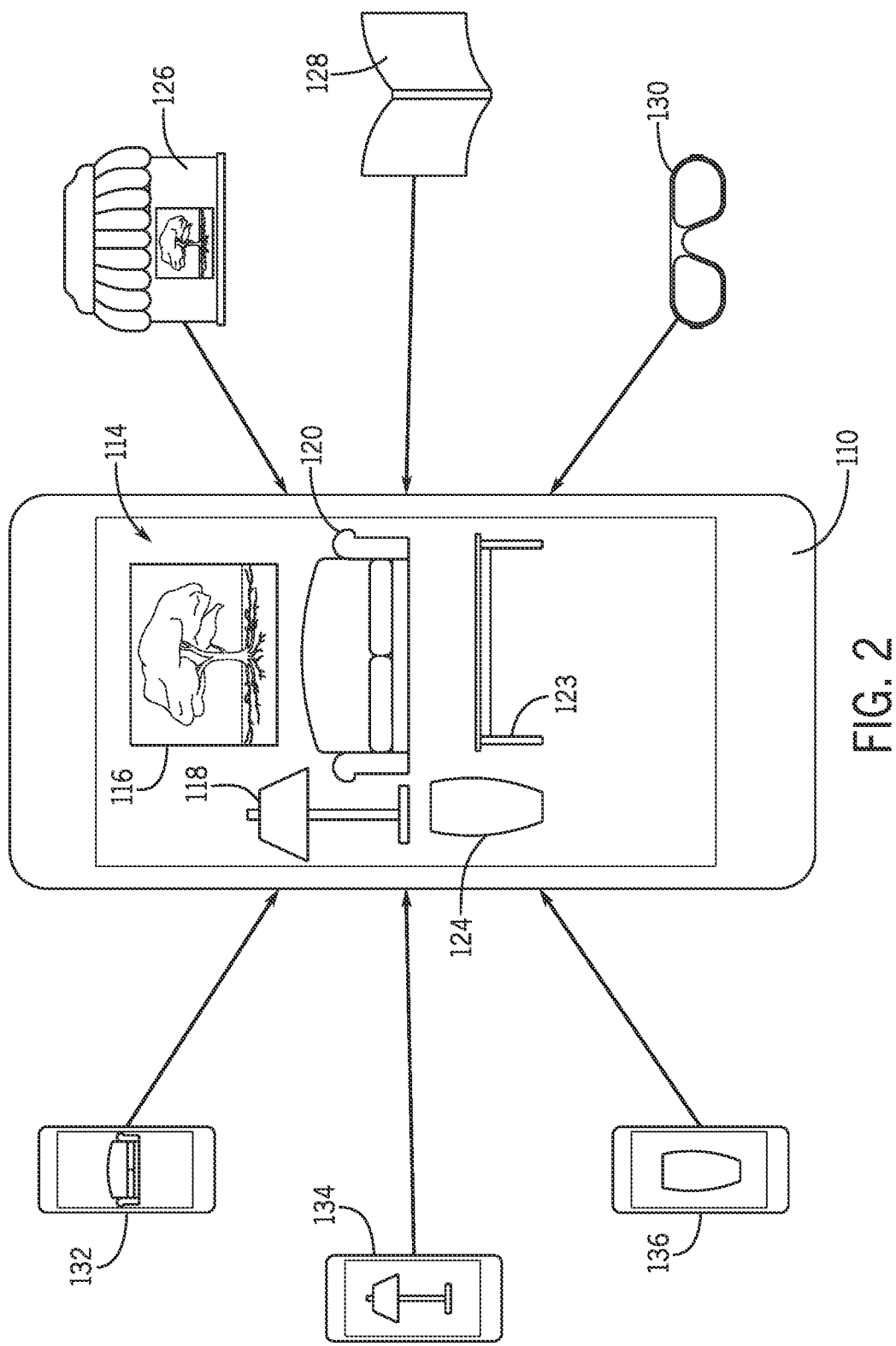
FIG. 2 illustrates an example of a virtual reality experience using objects rendered with the system of FIG. 1.

FIG. 2 illustrates an example of an AR experience rendered on a user device 110 utilizing the system 100. With reference to FIG. 2, the AR experience 114 includes objects, such as those from the object database 102, that are rendered with the associated container effect, from the effect database 104, to create a realistic user experience. In some instances, the background or select objects within the AR environment may be those detected from the user device 110 (e.g., via the camera), allowing the AR experience 114 to blend or composite virtually generated objects or effects with physical world objects. In the specific example of FIG. 2, there are five different objects that are pulled from different parties or locations (e.g., from different retailer databases), which may be selected by a user, to be included in the AR experience 114. For example, a first object 120 (sofa in this example) may be selected from an online advertising platform or social media platform 132, a second object 118 may be selected from a third party website 134, such as a retailer, a third object 124 may be retrieved from an online auction or classifieds website 136, a fourth object 124 may be retrieved from a physical store 126 (e.g., from a picture of the object captured by the user device) or a third party catalogue (online or hard copy). Additionally, other objects may be selected by the user for inclusion in the AR experience from other sources, such as a product catalogue 128, and/or AR devices 130 (e.g., glasses, head mounted displays, other wearables).

As shown in FIG. 2, multiple objects are positioned within the AR experience 114 where the objects can be selected from various sources or locations and combined together. Additionally, the objects are rendered with AR effects depending on the object type, such that the AR effects do not need to be recreated as new objects are added or removed into the AR experience 114, such as replacing a first object with a second object. This is because the container effect is stored in the effect database 104 and is separated from the object model and other shape information. For example, the same AR lighting effect may be applied to all objects within a select container and as objects are replaced within an AR experience 114 with the container effect, the same lighting effect may be applied.

Figure 3:
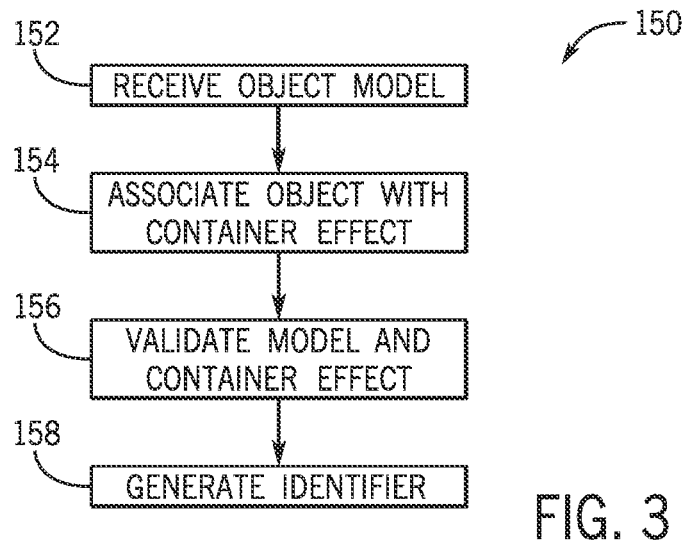
FIG. 3 illustrates a flow chart for associating objects with container effects.

FIG. 3 illustrates a method 150 of associating objects with a particular AR effect. The method 150 begins with operation 152 and the object model is received. For example, a third party may transmit an object model to the object database 102, where the object model includes shape information, such as 3D information, that can be used to generate a virtual representation of the object. As another example, a user may capture multiple pictures of an object, that can then be used to generate shape information, such as a 3D mesh.

In operation 154 the object is associated with a container effect. For example, an object category or type may be determined, such as via a user input, analysis of metadata and other information coupled to the object, or the like. Once the object type or category has been identified, the type is matched with one or more corresponding container effects. For example, for a furniture object, such as a sofa, the system may determine that the object is "furniture" based on metadata accompanying the shape information and then may identify the container effect for "furniture." The identification of an object and a particular container effect can be done in various manners, including image recognition, artificial intelligence, metadata review, and the like. In this manner, the effects may be abstracted from the object and the matching done between the container category and the object category.

In operation 156, the object shape information (e.g., 3D model) and associated container effect may be validated. For example, the object shape information is analyzed with respect to the selected AR effects tied to the associated container effect to determine if they are correct for the object and whether there are artifacts or issues presented during rendering of the object with the designated AR effects. The validation may also include determining whether the shape information for the object is sufficient to render the AR effects, e.g., is a complete model and includes the necessary information to show the object sufficiently within the AR environment. In one example, the validation step may include rendering the AR effect for the object within a testing or sample AR environment, and analyzing the rendered AR test environment for potential issues, artifacts, or the like.

In operation 158, an identifier or tag for the object and container effect association is generated. For example, a link (e.g., URI) may be generated that identifies the location of the object shape information, such as on object database 102, and the container effect associated with the object, such as from the effect database 104. The identifier may be an address or other locator for the shape information for the object and an address or other locator for the respective container effect. As one example, the URI may include a lookup table that identifies a particular memory location for the object shape information within the object database 102 and a particular memory location for the particular container effect within the effect database 104. In other examples, the identifiers may directly link to the respective memory locations for the object shape information and the container effect. Once an identifier is generated, the system 100 may be able to utilize the object shape information in an AR experience 114 by separately retrieving the AR effects defined by the associated container effect and effects within a particular AR container can be applied to multiple objects.

By genericizing AR effects to be applicable to categories of objects and assigning objects an AR effect based on the category, the computing system 100 of FIG. 1 can generate AR experiences using objects from multiple different sources that may or may not be in communication or related to each other, e.g., a first object from a first retailer can be incorporated into an AR experience with a second object from a second retailer, unrelated to the first retailer. Conventional AR experiences are typically specific to a particular object source and combinations across platforms and parties is not possible. Further, specifically rendering AR effects for individual objects is resource and time intensive and limits the number of objects that can be included within an AR experience. The combination and aggregation of objects within an AR experience allows a user to more easily envision and interact with the AR experience in a more realistic manner, e.g., more similar to the way a consumer shops for products in a physical store or mall.

Figure 4:
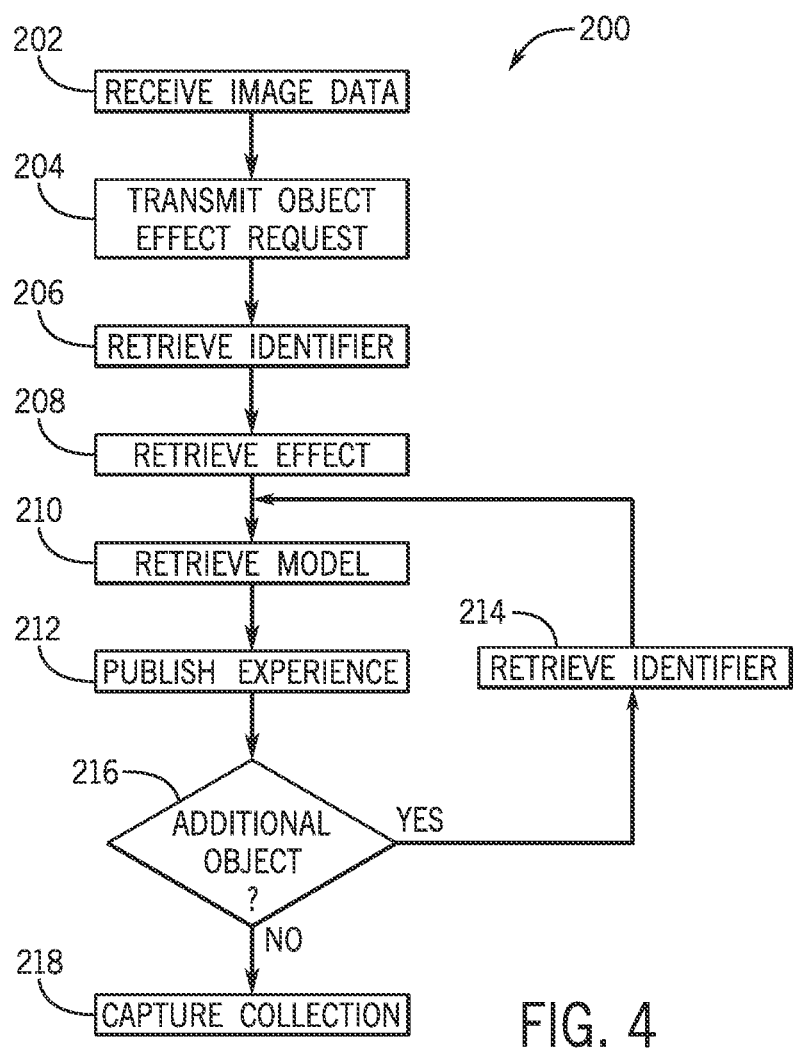
FIG. 4 illustrates a flow chart for publishing a virtual reality experience using container effects.

FIG. 4 illustrates a method 200 for utilizing the container effects and object association to render an AR experience. The method 200 includes operation 202 and image data may be received, such as from the user device 110. The image data may be data captured from a camera on the user device 110 and may often form the background or select aspects of the AR experience 114. For example, the user may capture an image of a room that the user wishes to explore placement of different objects within. The image data may be a still image or video images (e.g., one frame or multiple frames). In other embodiments, such as AR experiences where a user may virtually explore a virtual world, this operation may be omitted.

In operation 204, an object effect request is transmitted from a user device 110 to a server, such as content database 106. The object effect request may include a selection from a user indicating an object that the user wishes to include in the AR experience 114. The object effect request may be via a link selection (e.g., from a third party website or application), from an analysis of an image to determine an object for the AR experience 114 (e.g., barcode scan, QR scan, image recognition, etc.), or other input mechanisms from the user. The type of object effect request may be varied depending on the environment where the user identifies the object (e.g., website, social media platform, physical store, catalogue, etc.).

In operation 206, the identifier for the object is retrieved. For example, the identifier generated in method 150 of FIG. 3, may be retrieved from a storage location, such as on the object database 102 or content database 106. The identifier may be retrieved by identifying the object reference or locator and using the object reference to lookup the identifier.

In operation 208, the identifier is used to retrieve the AR effects for the object. For example, the identifier is used to locate the selected container effect associated with the object, such as the location in the effect database 104. In some instances the identifier may point to a selected container and the effects are determined based on the container associated therewith.

In operation 210, the shape information or the object model is retrieved. For example, the identifier may include a location for the shape information for the object on the object database 102. In this manner, the shape information may be dynamically added to the effect. In some embodiments, the shape information may be hosted on a central object repository (e.g., one that stores information for objects from multiple sources) and in other embodiments the object shape information may be used hosted on a party specific repository, such as a retailer database.

In operation 212, the retrieved shape information and the AR effects defined by the container effect for the object are used to publish the AR experience 114. For example, the selected object is overlaid, integrated, composited, or otherwise included into the image data captured by the user device 110, to generate an AR experience. Or may be incorporated into another virtual image, such as a virtual world. As a specific example, as the user is capturing an image or video of a particular space, such as a room in a house or apartment, the user can identify an object, such as a sofa from a retailer via the retailer's website. Using shape information for the sofa and predetermined effects for a "sofa" or "furniture" category of container effects, the lighting, positioning, transition, and other AR effects, defined by the category, are used to render the sofa within the image data. This allows the user to visualize the particular object, e.g., sofa, within the room and experience the sofa with lighting, positioning, and other defined effects that increase the realism of the AR experience 114.

In operation 216, the method 200 may include determining whether additional objects are added or whether there are changes to the included objects (e.g., change in color, texture, or the like). For example, the user may provide an input to select additional objects to include within the AR environment, similar to operation 204. As a specific example, the user may want to add a lamp within the AR experience 114 including the sofa, and select a lamp from an online or physical location to include in the AR experience 114.

If an additional object is selected, the method 200 may proceed to operation 214 and the identifier for the additional object is retrieved. This operation may be substantially the same as operation 206. The method 200 then returns to operation 210 and the model is retrieved and operation 212 the updated AR environment is published. In some instances, the effect for the object may not need to be retrieved (i.e., operation 208 is omitted for additional objects), since the effects may be applicable to the same types of objects, e.g., a furniture category, as long as the container effect is the same between the two objects. In these instances, the method 200 may optionally include a validation operation where the container effect for the new object is compared to the currently rendered container effects to determine if a change is needed. Alternatively, the user may be restricted at the input stage from adding objects with different container effect categories into a currently published environment.

If in operation 216, no additional objects are added, the method 200 may proceed to operation 218 and optionally a collection or user look can be captured or saved. The collection may save the objects included in the AR experience and/or the identifiers associated with the objects. In some instances, the background image data from the user device may also be included. The collection may allow a user to easily re-render the AR experience 114. For example, the user may identify a particular assortment of objects, e.g., sofa 120, table 123, painting 116, etc., that the user wishes to try out in different rooms or other different background data. By saving the collection, the user can easily and quickly publish the AR experience with new image data.

Figure 5:
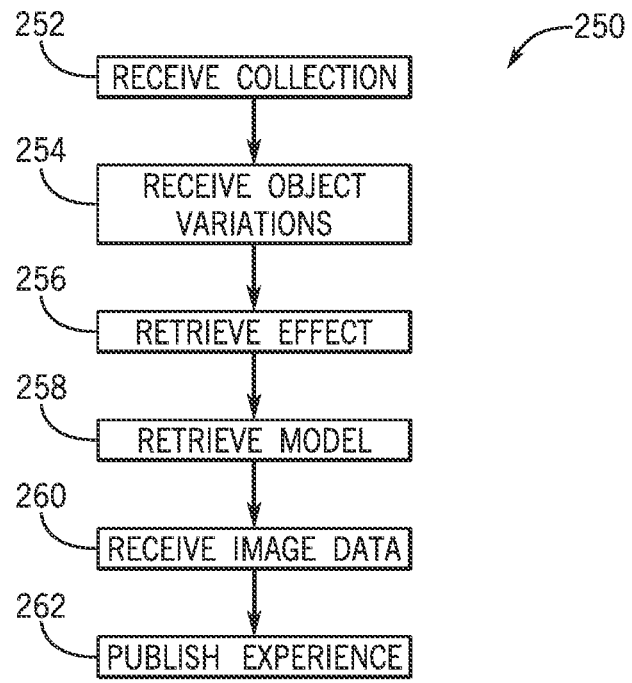
FIG. 5 illustrates a flow chart for using a collection of objects to publish a virtual reality experience.

Additionally, the collections may be transmitted to other user devices or users, e.g., via messaging systems, email, social media platforms, URLs, or other mediums. FIG. 5 illustrates a method 250 for using a collection to transmit AR experiences to other user devices, such as user device 110 to user device 112. In operation 252, the second user device 112 may receive a collection, such as from the first user device 110. The collection includes object information and optionally the container effect identifier.

In operation 254, the second user object specific variations, such as color, texture, size, and the like, may be received. For example, a display screen may be presented that links to the object location, e.g., retailer website, advertisement, or the like, including options for a user to identify object specifics, parameters, or variants that the user wants to include in the AR experience, e.g., color, size, texturing, etc.

Using the object specific variations, as well as the object identifier, in operation 256 the effects defined by the container effect associated with the object are retrieved, such as from the effect database 104. In operation 258, the shape information for the object is then retrieved, such as from the object database 102.

In operation 260, image data may be retrieved, such as new background or other environmental information from the user device 112 or the like. In this manner, the second user can incorporate the objects within a new and user specific environment. Then, in operation 262 the AR experience 114 is published, including the objects and the new image data.

Figure 6:
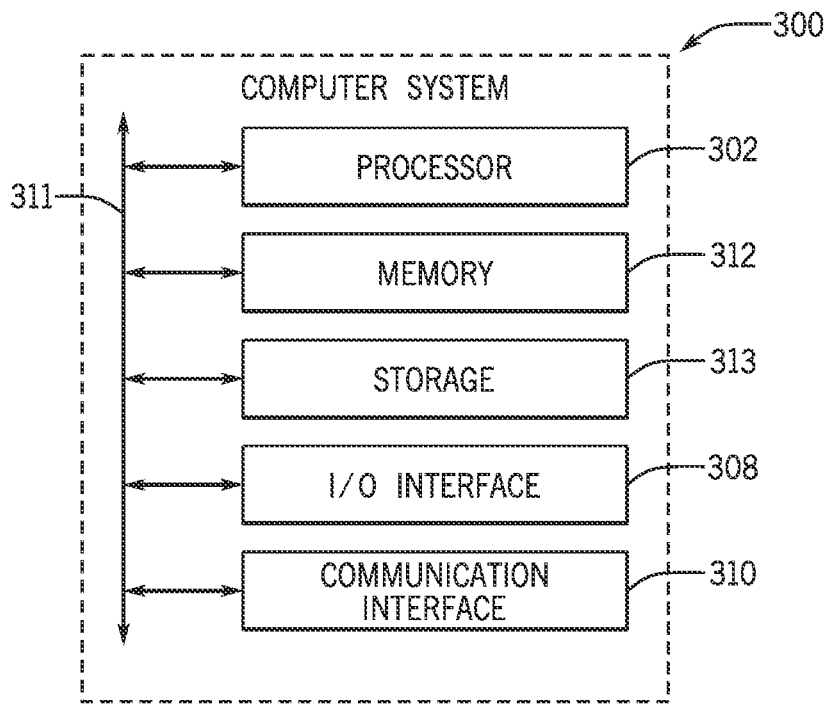
FIG. 6 illustrate a simplified block diagram of one or more computing devices that can be incorporated into the computing system of FIG. 1.

FIG. 6 illustrates a simplified block diagram of one or more computing devices or computing nodes that may be used within the system 100, e.g., servers 102, 104, 106, and/or user devices 110, 112. In particular embodiments, one or more computer systems 300 perform one or more steps of one or more methods described or illustrated herein, e.g., methods 150, 200, 250. Software running on one or more computer systems 300 performs one or more steps of one or more methods described or illustrated herein or provides functionality described or illustrated herein. Particular embodiments include one or more portions of one or more computer systems 300. Reference to a computer system may encompass a computing device, and vice versa, where appropriate. Moreover, reference to a computer system may encompass one or more computer systems, where appropriate.

Any suitable number of computer systems 300 may be included within the system 100 and the computer systems 300 utilized can take various physical forms. As example, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. One or more computer systems 300 may perform without substantial spatial or temporal limitation one or more steps of one or more methods described or illustrated herein, e.g., methods 150, 200, 250. As an example, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

The computer system 300 may include one or more of the following components: processor 302, memory 312, storage 313, an input/output (I/O) interface 308, a communication interface 310, and a bus 311. Although this disclosure describes and illustrates a particular computer system having a particular number of particular components in a particular arrangement, this disclosure contemplates any suitable computer system having any suitable number of any suitable components in any suitable arrangement.

The processor 302 includes hardware for executing instructions, such as those making up a computer program. As an example, to execute instructions, processor 302 may retrieve (or fetch) the instructions from an internal register, an internal cache, memory 312, or storage 313; decode and execute them; and then write one or more results to an internal register, an internal cache, memory 312, or storage 313. In particular embodiments, processor 302 may include one or more internal caches for data, instructions, or addresses. Processor 302 may include any suitable number of any suitable internal caches, where appropriate. As an example, processor 302 may include one or more instruction caches, one or more data caches, and one or more translation lookaside buffers (TLBs). Instructions in the instruction caches may be copies of instructions in memory 312 or storage 313, and the instruction caches may speed up retrieval of those instructions by processor 302. Data in the data caches may be copies of data in memory 312 or storage 313 for instructions executing at processor 302 to operate on; the results of previous instructions executed at processor 302 for access by subsequent instructions executing at processor 302 or for writing to memory 312 or storage 313; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

The memory 312 includes main memory for storing instructions for processor 302 to execute or data for processor 302 to operate on. As an example and not by way of limitation, computer system 300 may load instructions from storage 313 or another source (such as, for example, another computer system 300) to memory 312. Processor 302 may then load the instructions from memory 312 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 312. In particular embodiments, processor 302 executes only instructions in one or more internal registers or internal caches or in memory 312 (as opposed to storage 313 or elsewhere) and operates only on data in one or more internal registers or internal caches or in memory 312 (as opposed to storage 313 or elsewhere).

One or more memory buses (which may each include an address bus and a data bus) may couple processor 302 to memory 312. Bus 311 may include one or more memory buses, as described below. In particular embodiments, one or more memory management units (MMUs) reside between processor 302 and memory 312 and facilitate accesses to memory 312 requested by processor 302. In particular embodiments, memory 312 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 312 may include one or more memories 312, where appropriate. Although this disclosure describes and illustrates particular memory, this disclosure contemplates any suitable memory.

Storage 313 includes mass storage for data or instructions. As an example and not by way of limitation, storage 313 may include a hard disk drive (HDD), a floppy disk drive, flash memory, an optical disc, a magneto-optical disc, magnetic tape, or a Universal Serial Bus (USB) drive or a combination of two or more of these. Storage 313 may include removable or non-removable (or fixed) media, where appropriate. Storage 313 may be internal or external to computer system 300, where appropriate. In particular embodiments, storage 313 is non-volatile, solid-state memory. In particular embodiments, storage 313 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 313 taking any suitable physical form. Storage 313 may include one or more storage control units facilitating communication between processor 302 and storage 313, where appropriate. Where appropriate, storage 313 may include one or more storages 313. Although this disclosure describes and illustrates particular storage, this disclosure contemplates any suitable storage.

The I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, V/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

The communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

The bus 311 includes hardware, software, or both coupling components of computer system 300 to each other. As an example and not by way of limitation, bus 311 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 311 may include one or more buses 311, where appropriate. Although this disclosure describes and illustrates a particular bus, this disclosure contemplates any suitable bus or interconnect.

A computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 7:
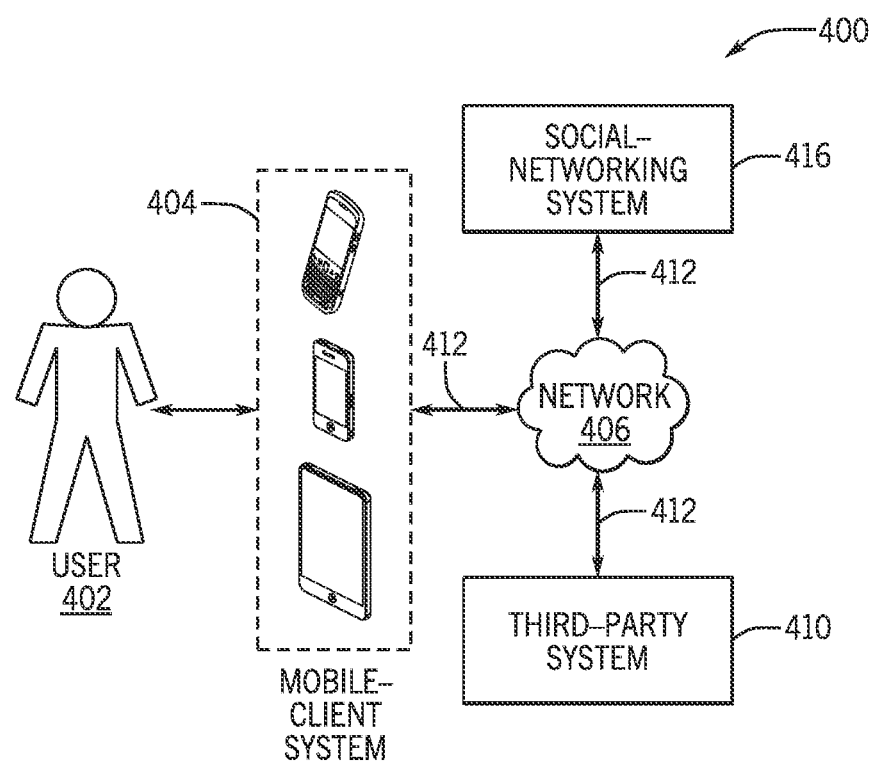
FIG. 7 illustrates an example network environment associated with a social-networking system.

As noted above, the system 100 may be incorporated into or otherwise utilize one or more social networking systems or environments. FIG. 7 illustrates an example network environment 400 including a user 402, a client system 404, a social networking system 416, and a third party system 410, connected to each other via a network 406. The third party systems 410 and/or client system 404, social networking system 416, may include one or more of the computer resources or databases 102, 104, 106 utilized by the system 100 to render one or more of the container effects.

Although FIG. 7 illustrate a illustrates a particular arrangement of user 402, client system 404, social-networking system 416, third-party system 410, and network 406, any suitable arrangement of user 402, client system 404, social-networking system 416, third-party system 410, and network 406 may be implemented. As an example, two or more of client system 404, social-networking system 416, and third-party system 410 may be connected to each other directly, bypassing network 406. As another example, two or more of client system 404, social-networking system 416, and third-party system 410 may be physically or logically co-located with each other in whole or in part. Moreover, although FIG. 7 illustrates a particular number of users 402, client systems 404, social-networking systems 416, third-party systems 410, and networks 406, various numbers of users 1201, client systems 404, social-networking systems 416, third-party systems 410, and networks 406 may be included within the environment 400. As an example, network environment 400 may include multiple users 402, client system 404, social-networking systems 416, third-party systems 410, and networks 406.

The user 402 may be an individual (human user), an entity (e.g., an enterprise, business, or third-party application), or a group (e.g., of individuals or entities) that interacts or communicates with or over social-networking system 416. In particular embodiments, social-networking system 416 may be a network-addressable computing system hosting an online social network. Social-networking system 416 may generate, store, receive, and send social-networking data, such as, for example, user-profile data, concept-profile data, social-graph information, or other suitable data related to the online social network. Social-networking system 416 may be accessed by the other components of network environment 400 either directly or via network 406. In particular embodiments, social-networking system 416 may include an authorization server (or other suitable component(s)) that allows users 402 to opt in to or opt out of having their actions logged by social-networking system 416 or shared with other systems (e.g., third-party systems 410), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 400 through blocking, data hashing, anonymization, or other suitable techniques as appropriate. Third-party system 410 may be accessed by the other components of network environment 400 either directly or via network 406. In particular embodiments, one or more users 402 may use one or more client systems 404 to access, send data to, and receive data from social-networking system 416 or third-party system 410. Client system 404 may access social-networking system 416 or third-party system 410 directly, via network 406, or via a third-party system. As an example and not by way of limitation, client system 404 may access third-party system 410 via social-networking system 416. Client system 404 may be any suitable computing device, such as, for example, a personal computer, a laptop computer, a cellular telephone, a smartphone, a tablet computer, or an augmented/virtual reality device.

This disclosure contemplates any suitable network 406. As an example and not by way of limitation, one or more portions of network 406 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 406 may include one or more networks 406.

Links 412 may connect client system 404, social-networking system 416, and third-party system 410 to communication network 406 or to each other. This disclosure contemplates any suitable links 412. In particular embodiments, one or more links 412 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 412 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 412, or a combination of two or more such links 412. Links 412 need not necessarily be the same throughout network environment 1200. One or more first links 412 may differ in one or more respects from one or more second links 412.

Conclusion

The methods and systems are described herein with reference to objects captured from third party sources and AR environments including user image data. However, these techniques are equally applicable to other types of object data and virtual environments. Additionally, although the discussions presented herein are discussed with respect to select AR effects, in some instances, the types of rendering selections used for the objects may be varied depending on the environment. As such, the discussion of any particular embodiment is meant as illustrative only. Further, features and modules from various embodiments may be substituted freely between other embodiments.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

As used herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein.

Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A computer implemented method comprising:
receiving, by a computing system and from a first third party database, a first model of a first object;
determining, based at least in part on the first model, that the first object is associated with a category of objects;
determining, based at least in part on the category of objects, a container effect associated with the first object, wherein the container effect defines virtual effects of the category of objects;
receiving, by the computing system, validation information indicative of validating the association of the first object with the container effect;
rendering, at a computing device, a virtual representation of the first object in a virtual environment based at least in part on utilizing the first model of the first object and the virtual effects defined by the container effect;
receiving, from a second third party database, a second model of a second object, wherein the second third party database is distinct from the first third party database; and
modifying, by the computing device, the virtual environment to display the second object and the virtual effects defined by the container effect in the virtual environment, wherein the container effect is utilized to render a virtual representation of the second object based on the second model corresponding to the second object.

2. The computer implemented method of claim 1, wherein the association of the first object with the container effect is based at least in part on information regarding an object category for the first object, and wherein the association of the first object with the container effect is further based on matching, by the computing system, the object category of the first object to the category of objects associated with the container effect.

3. The computer implemented method of claim 1, wherein rendering, by the computing device, the virtual representation of the first object is further based at least in part on receiving the first model of the first object from a first object database and receiving the virtual effects defined by the container effect from an effect database, distinct from the first object database.

4. The computer implemented method of claim 1, further comprising displaying, at the computing device, the virtual environment to render the virtual representation of the first object.

5. The computer implemented method of claim 4, wherein generating the virtual environment, by the computing system, further comprises receiving image data from a camera and combining the image data with the virtual representation of the first object.

6. The computer implemented method of claim 5, further comprising defining, at the computing system, a collection including a reference to the first object;
receiving, at the computing system, updated image data; and
generating, by the computing system, a new virtual environment for display by the computing device, based at least in part on the collection and the updated image data by combining the updated image data with the first model of the first object and the virtual effects defined by the container effect for the first object.

7. The computer implemented method of claim 6, wherein generating the new virtual environment, by the computing system and based on the collection and the updated image data, further includes receiving one or more updated parameters corresponding to the first object.

8. The computer implemented method of claim 1, wherein virtual effects of the virtual representation of the second object are same as the virtual effects defined by the container effect for the virtual representation of the first object.

9. The computer implemented method of claim 1, wherein the category of objects comprises a furniture category, a clothing category, a makeup category, or combinations thereof.

10. The computer implemented method of claim 1, wherein one or more virtual effects of the virtual effects of the category of objects define at least one of a lighting, a position, an orientation, or an order of an associated object within the virtual environment.

11. A non-transitory computer readable storage medium including instructions that, when executed by at least one processor of a computing device, cause the computing device to perform a method comprising:
displaying a virtual representation of a first object having a container effect in a virtual environment, wherein the displaying is based at least in part on:
receiving object shape information regarding the first object,
determining, based at least in part on the object shape information, that the first object is associated with a category of objects,
determining, based at least in part on the category of objects, the container effect associated with the first object, wherein the container effect defines virtual effects of the category of objects,
generating an identifier for the object shape information and the container effect, wherein the identifier identifies a first location of the object shape information in a first database and a second location of the container effect in a second database different than the first database,
receiving validation information for validating the association of the first object with the container effect, and
utilizing a first model of the first object and the virtual effects defined by the container effect.

12. The non-transitory computer readable storage medium of claim 11, wherein the object shape information regarding the first object associated with the container effect is based at least in part on information regarding an object category for the first object, and wherein the association of the first object with the container effect is further based on matching, by a computer system, the object category for the first object to the container effect.

13. The non-transitory computer readable storage medium of claim 11, wherein the validation information is based at least in part on analyzing, by a computing system, the first model of the first object and the virtual effects defined by the container effect to determine that the virtual effects defined by the container effect correspond to the first object.

14. The non-transitory computer readable storage medium of claim 11, further comprising:
receiving information regarding a second object associated with the container effect;
receiving validation information for validating the association of the second object with the container effect; and
displaying a virtual representation of the second object having the container effect in the virtual environment, based at least in part on utilizing a second model of the second object and the virtual effects defined by the container effect.

15. The non-transitory computer readable storage medium of claim 11, wherein associating the first object to the container effect comprises:
identifying an object type; and
determining that the object type matches the category of objects.

16. The non-transitory computer readable storage medium of claim 11, wherein the virtual effects defined by the container effect define at least one of a lighting, a position, an orientation, or an order of an associated object within the virtual environment.

17. The non-transitory computer readable storage medium of claim 11, wherein the virtual environment is associated with image data captured from a camera of a user device and the virtual representation of the fir object is included in the image data.

18. The non-transitory computer readable storage medium of claim 11, further comprising:
generating a collection representing a saved virtual representation of the fir object, the collection configured to be transmitted to other computing devices.

19. The non-transitory computer readable storage medium of claim 11, wherein the first object is associated with at least one object variation including a color, a texture, or a size.

20. A computer implemented method comprising:
receiving, by a computing system, information regarding an object associated with a container effect, wherein the container effect defines virtual effects of a category of objects associated with the container effect;
analyzing, by the computing system, a model of the object and the virtual effects defined by the container effect to determine that the virtual effects defined by the container effect apply to the object, wherein analyzing the model of the object comprises determining a presence of artifacts during rendering of the object with the virtual effects;
receiving, by the computing system, validation information indicative of validating the association of the object with the container effect; and
rendering, at a computing device, a virtual representation of the object in a virtual environment based at least in part on utilizing the model of the object and the virtual effects defined by the container effect.

* * * * *